E. CURRAN.
COMBINED HORIZONTAL FURNACE FOR HEATING STEEL OR IRON PLATES, ANGLE IRONS, AND THE LIKE.
APPLICATION FILED JULY 29, 1910.
974,031.
Patented Oct. 25, 1910.
2 SHEETS—SHEET 1.
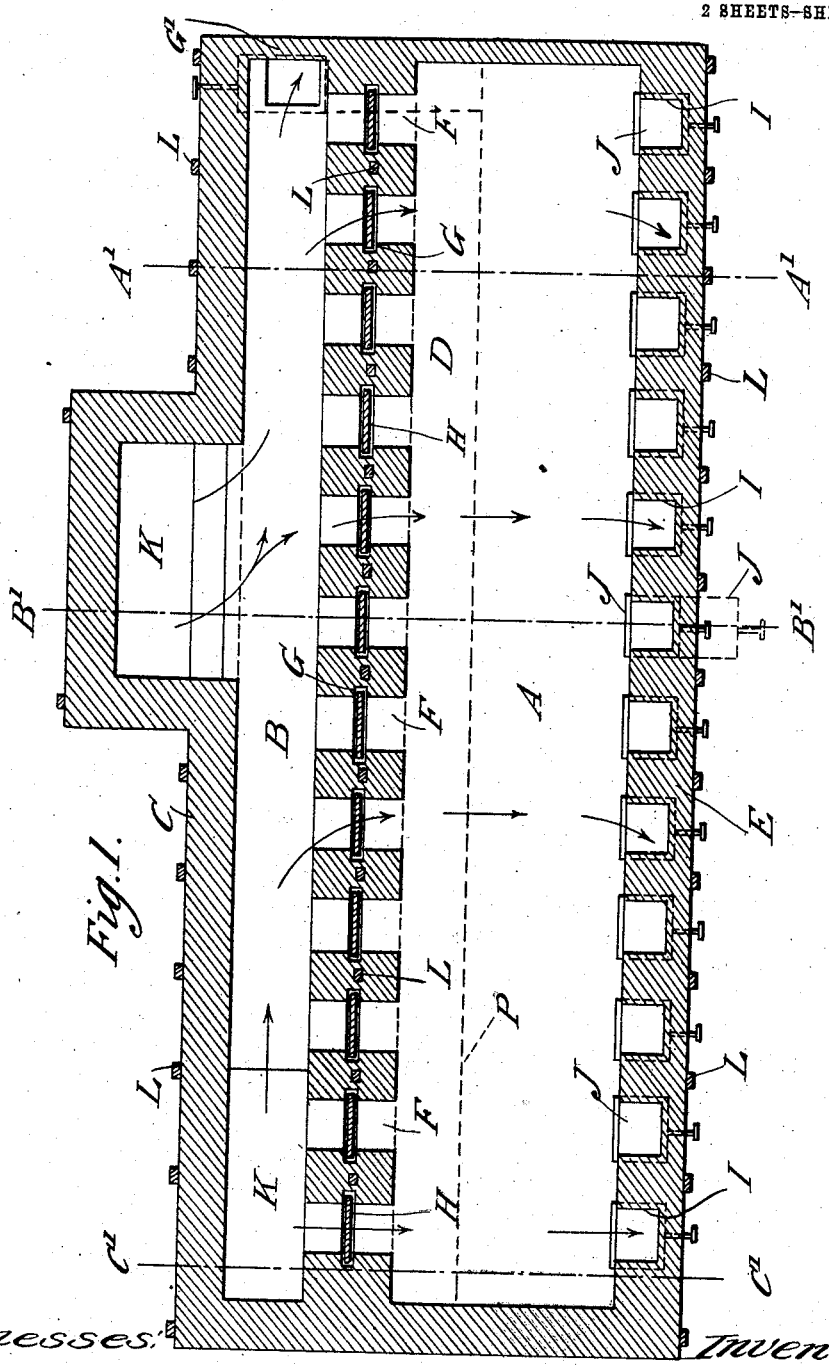

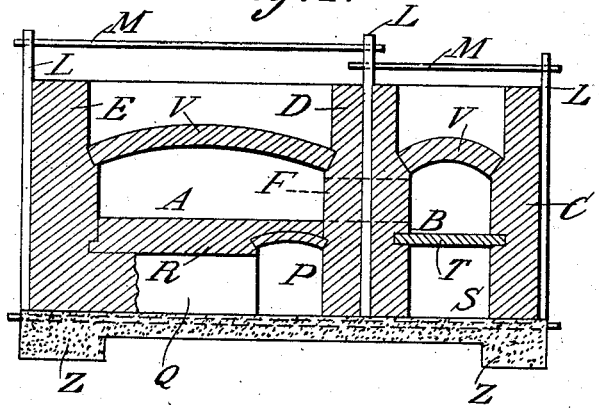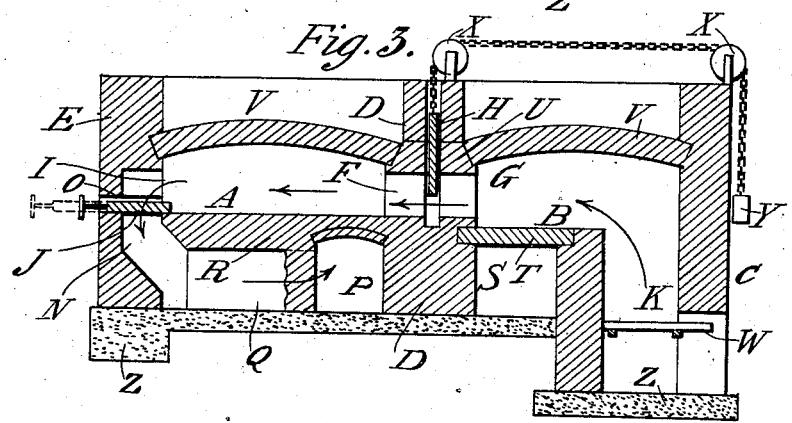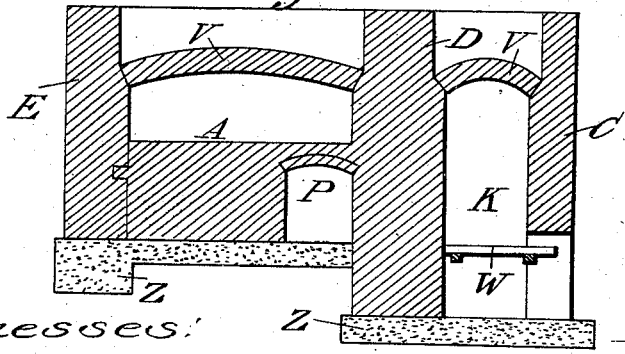

UNITED STATES PATENT OFFICE.

EDWARD CURRAN, OF CARDIFF, ENGLAND.

COMBINED HORIZONTAL FURNACE FOR HEATING STEEL OR IRON PLATES, ANGLE-IRONS, AND THE LIKE.

974,031. Specification of Letters Patent. Patented Oct. 25, 1910.

Application filed July 29, 1910. Serial No. 574,471.

*To all whom it may concern:*

Be it known that I, EDWARD CURRAN, a subject of the King of Great Britain, residing at 19 Sandon street, Cardiff, in the county of Glamorgan, Wales, England, furnace-builder, have invented certain new and useful Combined Horizontal Furnaces for Heating Steel or Iron Plates, Angle-Irons, and the Like, of which the following is a specification.

According to this invention multiple furnaces suitable for heating steel or iron plates, angle irons and other materials are combined in a single structure and are heated either simultaneously or separately by the hot gases which may for example be obtained from the combustion of fuel in one or more grates in the furnace structure and which, by means of a suitable arrangement of flues and dampers, can be made to traverse one or more of the heating furnaces in such manner that not only the supply of hot gases to the furnaces but also their course through the furnaces can be controlled as desired, so that for example, the furnaces may be heated equably throughout their length or so that the temperature may be graded from end to end of the furnaces or the heat confined more or less to one end of the furnace or furnaces or otherwise irregularly distributed.

The invention will be more particularly described with reference to a double furnace adapted to heat plates and angle irons, a wide furnace being provided for the plates and a comparatively narrow furnace for angle irons. According to this invention such a combined heating furnace has three parallel longitudinal walls built to the top of the furnace, two being outside walls and the third a party wall separating the two furnaces, as shown in sectional plan in Figure 1 of the accompanying drawings and in transverse vertical section in Figs. 2, 3 and 4, which sections are taken respectively on lines A', A', B', B', and C', C' of Fig. 1.

As therein shown, A is the floor and E the outside wall of the plate heating furnace hearth, B the floor and C the outside wall of the angle iron furnace hearth, and D is the party wall between the two furnaces in which a number of openings F are made, each of them controlled by a damper or dampers H which are arranged to be raised or lowered in the vertical spaces G provided in the covers U surmounting the openings F in the wall. The vertical dampers H are suspended by chains which pass over sheaves X and are balanced by counterweights Y suspended from the ends of the chains. On the opposite side of the plate furnace is a number of ducts or openings I controlled by dampers J and leading from above the level of the plate furnace floor to flues below the floor. As shown in Fig. 3 these openings are constituted by vertical recesses N formed in the inner sides of the wall E and extending above and below the level of the furnace floor, the horizontal dampers J being fitted to slide in lateral spaces or slots O extending through the wall E at the level of the furnace floor, so that the passage of gases from the furnace to the flues below the floor may be controlled as desired.

Under the floor of the furnace A is a main longitudinal flue P leading to the chimney, one side of this flue being constituted by the lower part of the party wall D. Smaller flues Q, corresponding in number with the openings controlled by the dampers J, lead from the recesses N in the wall E to the flue P which they join at an angle. At the front end G' of the furnace is a transverse flue leading to the flue P from an opening in the floor of the angle iron furnace which is controlled by a damper accommodated in a slot provided in the outer wall of the angle iron furnace.

The covering R of the flues P, Q forms the floor of the plate furnace, and the angle iron furnace is provided with a floor T which may or may not be at the same level as that of the plate furnace, the bottom portion S of the angle iron furnace being available for other purposes, for example as a heating flue to preheat the air supplied to the firegrate or grates.

The roof of the furnaces may be formed of separate arches V, V built over the respective furnaces and supported at their inner sides by the party wall D and at their outer sides by the walls C, E respectively. The walls of the furnaces are suitably braced, as by means of buck-straps L and tie bolts M, and are supported on concrete foundations Z.

The furnaces may be built to any desired sizes and the number of firegrates necessary to heat the furnaces should depend upon their sizes. For example, a double furnace of which the approximate inside dimensions are—plate furnaces, 38 feet by 7 feet by 2 feet 4 inches, and angle iron furnace 38 feet by 2 feet 6 inches by 1 foot 7½ inches, two fire grates should be provided. As shown, these grates K, K are preferably oblong in shape, one being erected at the rear end of the angle iron furnace and the other projecting outward from about the middle of the outside wall of the angle iron furnace, the fire bars W being supported at a level preferably considerably below that of the heating furnace floor, as shown.

The hot gases from both fireplaces K pass directly to the angle iron furnace, and through any one or more openings in the party wall to the plate furnace, the gases traversing the furnaces being led by the respective furnace flues to the main flue and thence passing to the chimney.

It will be seen that the direction or directions in which the gases traverse the plate furnace, as well as the supply to the furnace generally or various regions thereof, can be controlled very completely by manipulation of the two sets of dampers H, J, and this is true also to a considerable degree in the case of the angle iron furnace, the control being effected in the latter case by manipulation of the dampers H and the damper controlling the outlet at the end G' of the plate furnace and by using either or both of the fire grates K.

By completely closing the dampers H all the hot gases may be made to traverse the angle iron furnace only, and by closing the damper at the outlet end of the angle iron furnace and suitable manipulation of the dampers H, J the hot gases from both furnaces K, K may be arranged to pass substantially directly to the plate heating furnace without first traversing the angle iron furnace longitudinally.

Having thus described my invention and the best means I know of carrying the same into practical effect, I claim:—

1. A multiple furnace adapted for heating steel or iron plates and angle irons or the like, comprising a plurality of hearths ranged alongside each other and combined in a single structure and having a party wall, a fuel combustion space in the furnace structure, a series of openings being provided in the party wall between adjacent hearths, dampers controlling said openings, a main flue communicating with the chimney, flues leading from the respective hearths to the main flue and dampers controlling the said flues, whereby the path of the hot gases through the hearths as well as their supply thereto can be controlled, substantially as described.

2. A multiple furnace adapted for heating steel or iron plates and angle irons or the like, comprising a plurality of hearths ranged alongside each other and combined in a single structure and having a party wall, a plurality of fuel combustion spaces in the furnace structure, a series of openings being provided in the party wall between adjacent hearths, dampers controlling said openings, a main flue running longitudinally of the furnace structure and communicating with the chimney, transverse flues leading from the respective hearths to the said main flue, and dampers controlling said transverse flues, whereby the path of the hot gases through the hearths as well as their supply thereto can be controlled, substantially as described.

3. A furnace adapted for heating steel or iron plates and angle irons or the like comprising two hearths ranged alongside each other and combined in a single structure and having a party wall, a fuel combustion space in the said structure communicating directly with one of said hearths, a series of openings being provided in the party wall between the two hearths, dampers controlling said openings, a main flue running longitudinally of the furnace structure, a transverse flue leading from that hearth which is in direct communication with the combustion space to the main flue, said transverse flue being controlled by a damper, and a series of flues leading from the other hearth to the main flue, said flues being controlled by dampers and being formed in the wall opposite the party wall between the two hearths, substantially as described.

4. A double furnace adapted to heating steel or iron plates and angle irons or the like comprising a comparatively narrow and a comparatively wide hearth combined in one structure and divided by a party wall having a series of openings distributed along its length, dampers controlling said openings, a main flue running longitudinally of the furnace structure, a fuel combustion space at one end of the narrow hearth, an opening at the other end of the said hearth controlled by a damper and connected by a transverse flue with the main flue, a series of flues formed in the outer wall of the wide hearth disposed opposite to the openings in the party wall and leading to the main flue, and dampers controlling said flues, substantially as described.

5. A double furnace adapted for heating steel or iron plates and angle irons or the like, comprising a comparatively narrow and a comparatively wide hearth combined in one structure and divided by a party wall, a fuel combustion space at one end of the narrow hearth, a second fuel combustion space at an intermediate point and a gas outlet at the other end thereof, a main flue running longitudinally under the floor of the furnace structure, a transverse flue connecting the said gas outlet with the gas main flue, a damper controlling said gas outlet, a series of openings being provided in the party wall equally distributed along the length thereof, dampers controlling said openings, a series of flues in the outer wall of the wide hearth opposite to the party wall, said flues leading to the main flue and corresponding in number and disposition with the openings in the party wall, and dampers controlling the said series of flues, substantially as described.

In testimony whereof I have signed my name to this specification in the presence of two subscribing witnesses.

EDWARD CURRAN. [L. S.]

Witnesses:
ALBERT S. PHILLIPS,
J. M. DAY.